May 4, 1937.  J. F. HEALY, JR  2,079,252
ELECTRICALLY CONTROLLED POWER SYSTEM
Filed July 7, 1934  2 Sheets-Sheet 1

INVENTOR
Joseph F. Healy Jr.
BY
Wooster & Davis
ATTORNEYS

May 4, 1937.　　　J. F. HEALY, JR　　　2,079,252
ELECTRICALLY CONTROLLED POWER SYSTEM
Filed July 7, 1934　　　2 Sheets-Sheet 2
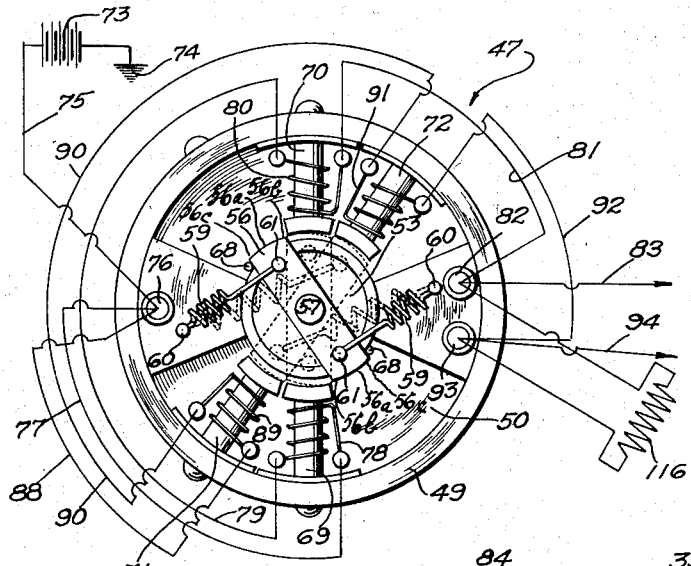
Fig. 2
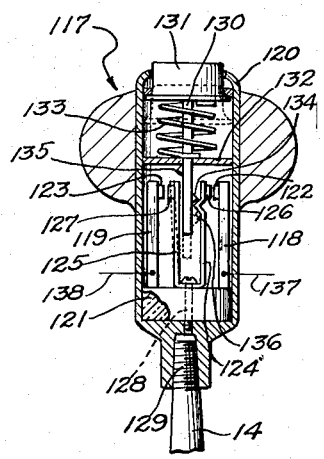
Fig. 8
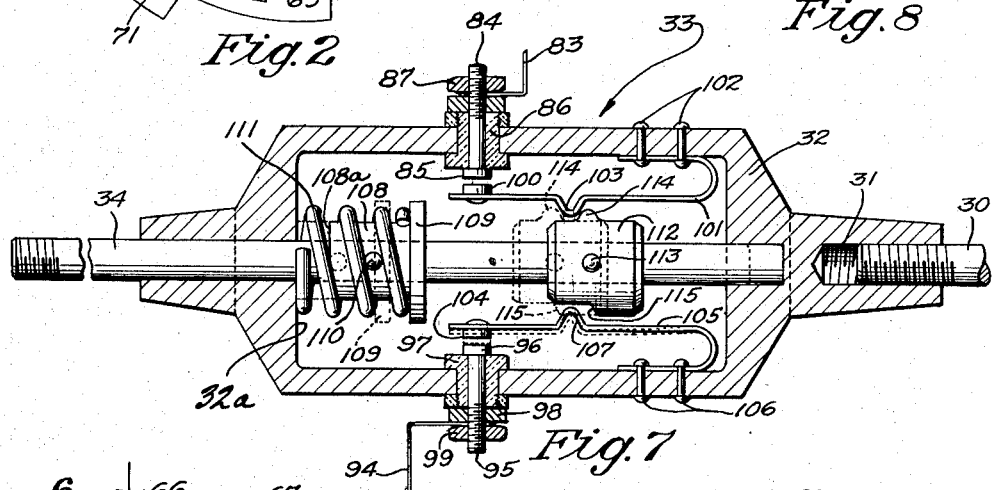
Fig. 7
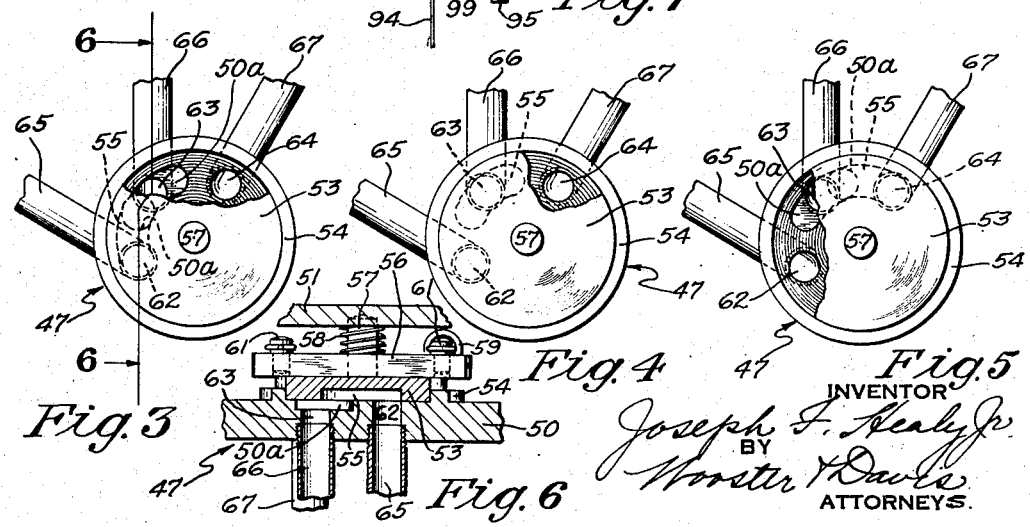
Fig. 3　　Fig. 4　　Fig. 5
Fig. 6
INVENTOR
Joseph F. Healy Jr.
BY
Wooster & Davis
ATTORNEYS.

Patented May 4, 1937

2,079,252

UNITED STATES PATENT OFFICE 2,079,252

ELECTRICALLY CONTROLLED POWER SYSTEM

Joseph F. Healy, Jr., Bridgeport, Conn., assignor of one-half to Charles G. Miller, Jr., Southport, Conn.

Application July 7, 1934, Serial No. 734,174

17 Claims. (Cl. 121—41)

This invention relates to new and useful improvements in electrically controlled power systems, and has relation to such a system particularly adapted to be applied to vehicle brakes.

An object of the invention is to provide a system particularly adapted for the control of vehicle, as automobile, brakes and including improved silent valve means which does not leak and which may be conveniently controlled.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

Fig. 2 is a top plan view of the valve and valve control means shown somewhat diagrammatically;

Fig. 3 is a diagrammatic top view of the valve alone when in normal position with the brakes released;

Fig. 4 is a view similar to Fig. 3 but showing the valve in holding position;

Fig. 5 is a similar view but showing the valve in "on" position;

Fig. 6 is a detail sectional view through the valve, the view being take along the plane indicated by the line 6—6 in Fig. 3;

Fig. 7 is a longitudinal sectional view through a foot brake operated valve control switch; and Fig. 8 is a similar view through a hand operated valve control switch.

Figure 1:
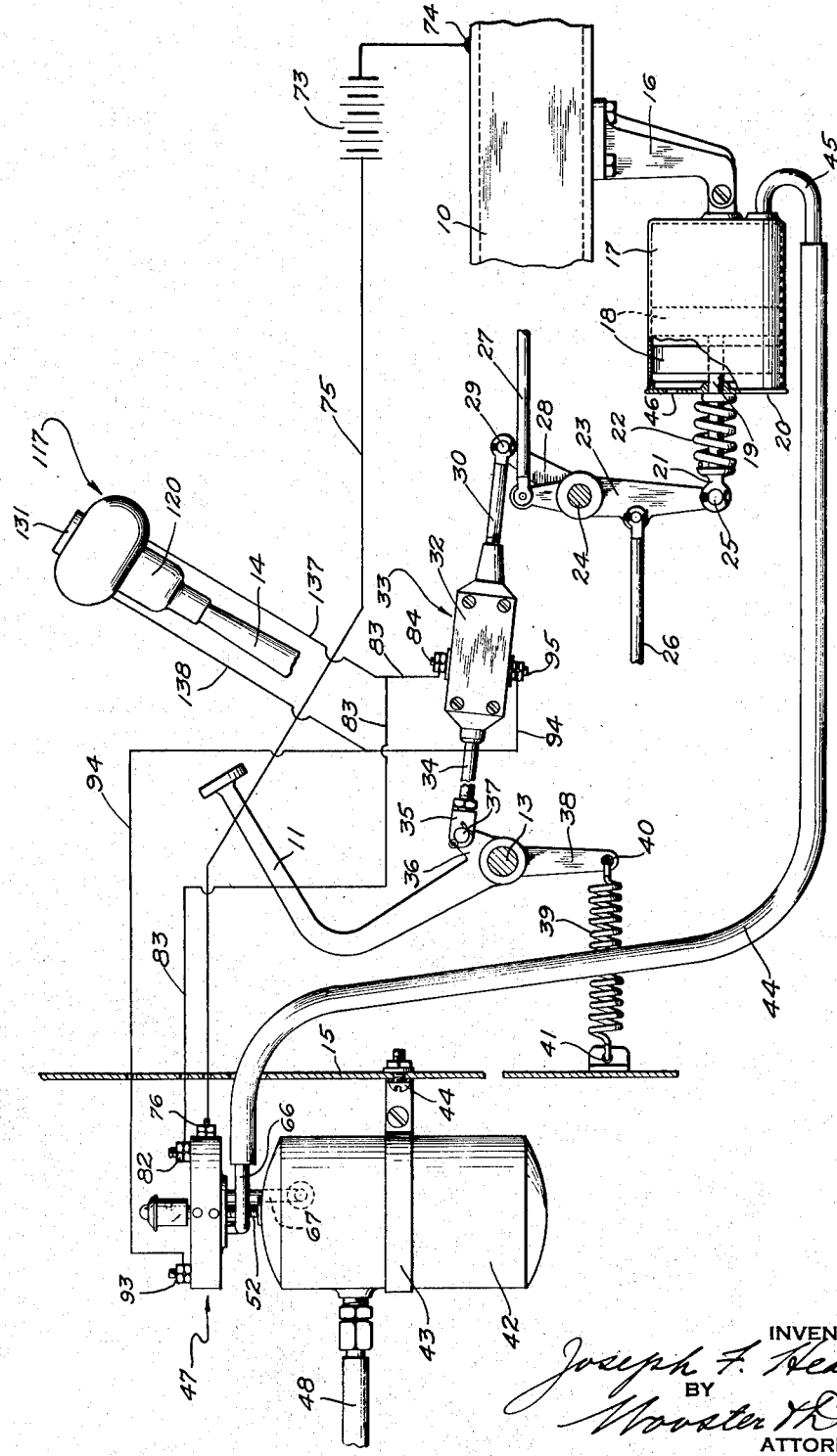
Fig. 1 is a more or less schematic view illustrating the present system.

Referring in detail to the drawings, Fig. 1 diagrammatically illustrates one application of the invention and in this figure 10 indicates a portion of the frame of a vehicle, as for example a portion of the chassis of an automobile, and at 11 is shown the usual brake pedal mounted for rocking movement with a shaft 13. The gear shift lever is indicated at 14 and a portion of the dash is designated 15. A bracket 16 bolted or otherwise secured to the frame 10 supports a power cylinder 17 in which is mounted a piston 18 secured to a rod 19 passing through the forward wall 20 of the cylinder and toward its outer end equipped with a head 21 between which and the cylinder and disposed about the rod is a coil spring 22 normally serving to maintain the piston and rod and other parts, as will later appear, in their normal positions.

A rocker arm 23 is secured to a bar or shaft 24 and to the lower end of said arm the head 21 is pivotally connected as at 25. It will be noted that the shaft 24 is located above the midway point of the arm 23 and pivotally connected to said arm below the shaft 24 is a brake rod 26 and pivotally secured to the upper end of said arm is another brake rod 27. It will be understood that the brake rods 26 and 27 may extend or are connected to the front and rear wheel brakes respectively of the vehicle. A lever 28 is also secured to the shaft 24 and to the upper end of this lever at 29 is pivotally secured the rear end of a rod 30 the forward end of which is threaded into a socket 31 in the rear portion of the housing or part 32 of a switch generally designated 33 and later to be more particularly described. Extending through the forward end of the switch housing 32 and movable with respect thereto is a rod 34 the forward end of which is threaded or otherwise connected with a head or coupling 35, which head or coupling 35 is pivotally connected with an extension 36 of the brake pedal as at 37.

Also secured to the shaft 13 is a depending lever 38 and a coil spring 39 has one of its ends secured to the lower end of lever 38 at 40 and has its other end anchored in a small bracket 41 carried by a stationary part of the car, the spring 39 constantly tends to keep the lever 38 in the position in which it is shown in Fig. 1 and to return such lever and parts associated therewith to such positions when moved therefrom. Forwardly of and mounted by the dash 15 is a vacuum tank 42 which may be supported in any suitable manner as for example by a ring 43 embracing the tank and secured to the dash by a bolt or the like 44. A flexible hose or other suitable coupling means 44 serves at the proper time, as will be later fully set forth, to place the vacuum tank 42 in communication with the rear end of the power cylinder 17, a piece of tubing 45 or the like serving to connect the rear end of the hose 44 with the cylinder. An opening 46 in the forward wall 20 of the cylinder serves to admit air to the cylinder at the forward side of the piston 18.

An electrically operated valve means 47 serves to control communication between the vacuum cylinder 42 and the power cylinder 17. It will be appreciated that on air being exhausted from the rear side of the piston 18 the air entering cylinder 17 through the port or opening 46 will force the piston rearwardly in the cylinder as suggested by the dotted lines in Fig. 1, and as the piston moves rearwardly the arm 23 will be rocked and will shift the brake rod 26 and 27 to apply the vehicle brakes. Vacuum is maintained in the tank 42 in any suitable manner as for example by connecting said tank with the suction side of the internal combustion engine when the system is applied to an automobile. This may be accomplished in any desired manner as by extending a tube 48 between the vacuum tank and the suction side of the engine (not shown). The connection 67 from the control valve 47 may be connected directly to the intake manifold of the engine if preferred thus doing away with the tank 42. In other words the valve connection 47 may be connected to any suitable source of suction, the tank 42 being used as a sort of accumulator for suction to maintain the operating suction more uniform.

The valve means 47 as shown comprises a body or housing 49 including a relatively thick bottom wall 50 and a cover or top wall 51 and the said valve means may be mounted in any suitable manner as for example at the upper side of the tank 42 and on said tank by means of a threaded stud or post 52. The valve per se comprises a disc 53 rotatable on the bottom wall 50 of the body 49 and within an upstanding annular guide bead 54 integral with said wall. In its lower side valve 53 is provided with an elongated or arcuate recess 55 the purpose of which will later appear, and at its upper side the said valve carries or has secured to it an armature 56, and extending upwardly from said armature and in fact through the armature, is a pivot pin 57 the upper end of which is received in a recess in the cover 51 of the housing. About said pin 57 and between the cover 51 and the armature 56 may be located a light coil spring 58 serving to maintain the valve against the wall 50 and to prevent upward movement of the valve due to jouncing of the vehicle.

Coil springs 59 are arranged in the housing 49 and these springs have their outer ends anchored to studs 60 and have their inner ends connected with pins 61 carried by the armature 56. These coil springs acting through the armature serve to retain the valve 53 in its normal position and constantly tend to return it to such position when moved therefrom as will later appear. Stops 68 coact with the armature to limit its backward or reverse movement. Through the bottom wall 50 of the housing 49 are three ports 62, 63 and 64. The port 62 may or may not have a tube 65 connected thereto and such port constitutes an atmospheric inlet port. Through a tube 66 the port 63 is connected with the forward end of the flexible hose 44, and through a tube 67 the port 64 is connected with the interior of the vacuum tank 42. There is a recess 50a in the bottom wall 50 extending laterally on opposite sides of opening 63 for sufficient distance to overlap the recess 55 when the valve 53 is in the positions of Figs. 3 and 5 to insure a full opening communication between ports 62 and 63 or ports 63 and 64. The recess 55 is of such length that it may overlap the port 62 and recess 50a or the port 64 and recess 50a so as to place the ports 62 and 63 in communication, or so as to place the ports 63 and 64 in communication. Normally the springs 59 hold the armature 56 against stop pins 68 and when the armature is so located the position of the valve 53 is such that its recess 55 is serving to place the ports 62 and 63 in communication as shown in Fig. 3.

Also, within the housing 49 are a pair of electro magnets 69 and 70 arranged diametrically opposite one another and a pair of electro magnets 71 and 72 also located diametrically opposite one another. A battery 73 is grounded as at 74 and from the other side of said battery a wire 75 leads to a binding post 76 on the housing 49. From said terminal or binding post 76 one wire 77 leads to a coil 78 of the magnet 69 and from the other end of said coil the wire 79 is connected with an end of the coil 80 of the magnet 70 from which the lead is through a wire 81 to a terminal or binding post 82 and from thence by means of a wire 83 to a terminal or binding post 84 on the switch housing 32. At its inner end the terminal 84 is provided with a contact 85 and the said terminal is insulated from housing 32 by an insulating bushing 86, and the wire 83 is secured to the said terminal as by being clamped against a washer by a nut 87.

From the terminal 76 a second wire 88 leads to the coil 89 of the magnet 71 and from said coil the wire 90 leads to the coil 91 of the magnet 72, and from thence a wire 92 extends to a terminal 93 from which is carried a wire 94 to a terminal or binding post 95 also in the switch housing 32. Terminal 95 at its inner end is provided with a contact 96 and the terminal is insulated from the housing by a bushing 97. The wire 94 is secured to the terminal as by being clamped against the washer 98 by means of a nut 99.

Switch housing 32 is grounded to the vehicle frame 10 as will be clear and within said housing and arranged to cooperate with the contact 85 of the terminal 84 is a contact 100 carried by a spring arm 101 secured to the housing 32 in any suitable manner as by the rivets 102. Intermediate its ends arm 101 is bent to provide a projection 103 the purpose of which will later appear. Also, within housing 32 is a contact 104 adapted to cooperate with the contact 96 of binding post 95 and said contact 104 is carried by a spring arm 105 secured to the housing by rivets 106. Spring arm 105 intermediate its ends is provided with a projection 107.

The rod 34 extends through the housing 32 and has bearing in the end walls thereof and is slidable relative to said housing. In the forward portion of the housing a sleeve 108 having a flange 109 is secured to the rod 34 as by pin 110 and a coil spring 111 surrounds the sleeve 108 and bears at its respective ends against the flange 109 and the forward wall of the switch housing 32, and serves normally to retain the rod 34 and the parts carried thereby in the position in which they are shown in Fig. 7. On the rear portion of the rod is secured a member 112, the said member being held in place as by a pin 113 whereby the member and rod are movable together as a unit. This member 112 has a raised portion or projection 114 on one side and on its opposite side is cut away providing a shoulder 115 and it will be noted that the said shoulder is slightly rearwardly of the projection 114 when viewed in Fig. 7. The lug 114 and shoulder 115 form cam surfaces cooperating with the lugs or projections 103 and 107 respectively of the switch arms 101 and 105 to close the switches as will presently be described.

In the operation of the system the parts are normally in the positions in which they are shown in full lines in Figs. 1, 2, 3, 7, and 8, the piston 18 being retracted or in the forward part of the cylinder 17, and the valve 53 being so positioned, as shown in Fig. 3, that the port 63 to the power cylinder 17 is in communication with the atmospheric port 62. Now on the pedal 11 being depressed the rod 34 is drawn forwardly compressing the spring 111 and moving the member 112 to have its projection 114 engage the projection 103 of the arm 101 and flex said arm so as to carry its contact 100 into engagement with the contact 85 of the terminal 84. This will result in a closing of the circuit to the coils of electromagnets 69 and 70 and they will attract the armature 56 swinging the valve 53 from the position of Fig. 3 to that of Fig. 4, and closing the power cylinder port 63.

As movement of rod 34 continues the projection 114 is carried beyond the projection 103 as shown by the dotted lines in Fig. 7 so that the circuit to the coils of magnets 69 and 70 is open. However, as this occurs the shoulder 115 engages the projection 107 of the spring arm 105 and flexes the latter to carry its contact into engagement with the contact 96 of the terminal 95. This closes the circuit to the coils of magnets 71 and 72 and they attract the armature 56 further swinging the valve 53 and carrying it into the position of Fig. 5. There it will be noted that the recess 55 of said valve occupies a position placing the suction port 64 in communication with the power cylinder port 63. This will result in exhausting of air from the cylinder 17 at the rear side of the piston 18 and air entering said cylinder through the opening 46 at the forward side of said piston forces the same rearwardly operating the rods 26 and 27 and applying the brakes. If preferred the opening for rod 19 in the cylinder head may be sufficiently large for entrance of air so opening 46 would not be necessary.

When brake applying movement of the pedal 11 is discontinued the switch housing 32 is advanced by action of piston 18 and carries the projection 107 of the spring arm 105 forwardly of the shoulder 115 of the member 112 and carries the projection 103 of the spring arm 101 into engagement with the projection 114 of said member 112. This results in opening of the circuit to the coils of magnets 71 and 72 and the closing of the circuit to the coils of magnets 69 and 70 so that the armature 56 is shifted and the valve 53 is carried from the position of Fig. 5 to that of Fig. 4. In this latter position the valve closes the power cylinder port 63 preventing the entrance of air to the cylinder at the rear side of the piston 18 whereby the piston is maintained in position with the brakes applied. If the brake pedal is further depressed the action described will be repeated since the power cylinder will again be placed in communication with the vacuum cylinder and when movement of the brake pedal is discontinued the switch housing will again catch up and bring about opening of the circuit to the coils of magnets 71 and 72 and closing of the circuit to the coils of magnets 69 and 70.

With this arrangement to maintain the brakes applied it is only necessary that the operator maintain the pedal 11 depressed and it is not necessary to exert manual effort on the brakes. It is simply a question of closing the switch. It will be understood that the movement of the switch housing 32 to open the circuit to the magnets 71 and 72 and close the circuit to the magnets 69 and 70 comes about due to the fact that as the piston 18 moves rearwardly in the cylinder 17 the said piston acting through the arm 23 will rock the shaft 24 and the latter will swing the lever 28 pressing the rod 30 forwardly. It will thus be seen that the amount the brakes are applied, or that is the braking effect, is always dependent on the amount to which the brake pedal is depressed. A relatively small depression of the pedal will apply the brakes lightly, and a greater depression give a greater brake application. Also in all positions a given application of the brakes may be maintained indefinitely without effort by the operator by merely depressing the pedal to the corresponding position and holding it there.

A resistance 116 is shunted across the two circuits of the respective magnets, it being shown as connected with the terminals 82 and 93. This is to make sure the control valve operates under all conditions. In emergency operation or where there is instantaneous operation of the mechanism, as for example where the brake pedal is quickly depressed for full and immediate application of the brakes, the pedal might move down so fast and the control switches be closed in succession so rapidly that the valve might fail to operate as rapidly as desired if this shunt 116 is not used. That is, due to the inertia in the valve 53 and its armature 56 and because under these conditions the magnets 69 and 70 would be energized for so short a time and the second set of magnets 71 and 72 are so far removed from the armature when it is in the off position they might not operate the valve as quickly as desired. The shunt gives sufficient energizing of first magnets 69 and 70 to insure immediate operation of the valve even if the pedal or other control is operated quickly to its fully advanced position. The shunt therefore energizes the first magnets sufficiently to give the armature a start and carry it into influence of magnets 71 and 72.

When the switch 100 only is closed, due to resistance 116, there is much more current in coils of magnets 69 and 70 than in the coils of magnets 71 and 72. Also, when switch 104 only is closed, due to this same resistance, there is much less current in the coils of magnets 69 and 70 than in the coils of magnets 71 and 72. Therefore on reverse movement, for example, as soon as switch 104 is opened the current is reduced in the coils of magnets 71 and 72 and increased in the coils of magnets 69 and 70 so that the valve 53 is immediately returned to the intermediate position. In an installation which has actually been used the resistance 116 was of such value that when the coils of magnets 69 and 70 were carrying about seven amperes the coils of magnets 71 and 72 were carrying about one ampere. This also means that when the coils of magnets 71 and 72 were carrying seven amperes the coils of magnets 69 and 70 were carrying only about one ampere.

The lugs 103 and 107 and cam elements 114 and 115 are so located that on operation of control member 11 and therefore shifting of member 112 to the left, the switch 100 is not opened until switch 104 is closed. Therefore in normal operation on movement of the switch there is no break between energization of magnets 69 and 70 and energization of magnets 71 and 72. Therefore no matter how slowly the control member was operated there would be no break which would allow the valve 53 to swing back to its normal or off position of Fig. 3 until the control member is released. Also in the reverse movement of the control member 11 and member 112 the switch 104 is not opened and magnets 71 and 72 deenergized until switch 109 is closed and magnets 69 and 70 energized.

When the pedal 11 is released the springs 39, 22, 59 and 111 serve to return all of their parts to their normal positions. This is true since on the brake pedal being released the rod 34 will be shifted rearwardly by its spring 111 and spring 39 and the member 112 will be carried to normal position leaving the spring contact carrying arms 101 and 105 free to return to their normal positions. When this occurs neither of the electromagnets will be energized and the springs 59 will be free to return the valve to the position of Fig. 3. With the valve in such position air may enter the cylinder 17 at the rear of the piston 18 to break the vacuum therein. This air is taken in through the atmospheric port 62 and passes through the recess 55 of the valve 53 and out through the port 63 through the tube 66, hose 44 and tube 45 to the cylinder. As the normal position of valve 53 is that in which it is shown in Fig. 3 it will be apparent that there is no likelihood or chance of a partial vacuum being maintained at the rear of the piston 18 so that the brakes would be accidentally held in a partially applied condition.

If for any reason the electrical control or the power device should fail to function, then depression of the pedal will shift the rod 34 to cause the shoulder 108a on member 108 to engage the end wall 32a of member 32. This will give a direct connection from the pedal to the brakes so that they will be operated in the usual manner by foot pressure. It will thus be seen that failure of the power device or its control will not cause failure of the brakes.

It is preferred that the ends 56a of the armature 56 be not struck on arcs with the axis of pivot 57 as its center but that these ends be tapered somewhat as shown so that the front portion 56b is farther from the faces of the magnets than the rear portions 56c as is shown by the dotted positions of the armature. This causes the torque to increase as the armature swings and the ends move closer to the cores of the magnets. It also permits the armature to better and more freely move back to the original position when the circuits are opened.

For hand control of the brakes, particularly when an automobile has been stopped while ascending a grade the various magnets for controlling the valve 53 may be controlled by a hand switch. When starting a car on a grade it is desirable to have one foot free for the control of the clutch and the other foot free to operate the accelerator. Considerable difficulty is sometimes experienced owing to the fact that the car will attempt to roll backwards before sufficient power is applied to the rear wheels. Therefore, I place a hand switch generally designated 117 in the gear shift lever 14 or at any other convenient location as on the steering wheel and this switch 117 is connected to control the electro magnets above referred to. It is preferred to place it on the gear shift lever as then applicant has complete control of the brakes and the gear shift at the same time and with the same hand.

Switch 117 includes rigid arms 118 and 119 mounted within a housing 120 and at their lower ends the said arms are supported by a block 121 of insulating material. Arm 118 carries a contact 122 and arm 119 carries a corresponding contact 123 and between said arms is mounted a U-shaped member including spring arms 124 and 125 on the upper ends of which are secured contacts 126, 127 respectively. The U-shaped member is secured in place as by screw 128 passing through the insulating block 121 and grounded on the casing or housing 120 threaded to the gear shift lever 14 as shown at 129. Extending between the arms 124 and 125 is a bar 130 to the upper end of which is secured a push button 131, and arranged between such push button and a partition 132, within the housing 120, is a coil spring 133 normally serving to retain the push button and the bar 130 in their uppermost positions.

Below the partition 132 the bar 130 is provided with vertically spaced projections 134 and 135. Further, the spring arm 124 is provided with a projection 136 extending into the path of the projection 134 of the bar 130. By means of a wire 137 the arm 118 is connected with the wire 83 before referred to as leading to the terminal 84 on the switch housing 32. A wire 138 connects arm 119 with the wire 94 leading to the terminal 95 on the switch casing 32. The lugs 134 and 135 are so located with respect to projection 136 and spring arm 125 that on depressing the push button 131 and bar 130 against the action of the spring 133 the projection 134 on said bar will engage the projection 136 of the spring arm 134 and force said arm outwardly to bring the contact thereof into engagement with the contact 122 of the arm 118 thereby closing a circuit to the magnets 69 and 70. Further, downward movement of the push button carries projection 134 below projection 136 and carries projection 135 into engagement with the upper end portion of the spring arm 125. This results in opening of the circuit to the magnets 69 and 70 and closing of the circuit to the magnets 71 and 72.

A further description of the function of the magnets is believed unnecessary but it will be clear that the projections 134 and 135 on the push button controlled bar 130 correspond with the projection 114 and the shoulder 115 respectively of the member 112 on the rod 34. It will further be understood that as long as the push button 131 is maintained depressed the circuits to the magnets 71 and 72 will be closed and the brakes will be applied. Immediately the push button is released the circuits to both sets of magnets are opened and the springs 59 will shift the armature 56 returning the valve 53 to its normal position of Fig. 3 and placing the portion of the cylinder 17 at the rear side of the piston 18 in communication with the atmosphere through the port 62. This breaks the vacuum in the cylinder and releases the vehicle brakes. If after the brakes are applied the desired amount the push button 131 is only partially released, or that is only sufficient to permit it to move upward a distance to move lug 135 from spring arm 125 and permit this arm to break its circuit but to cause lug 134 to engage projection 136 to maintain switch 122, 126 closed, then the valve 53 will return to the position of Fig. 4 at which the power cylinder 17 is disconnected from both the atmosphere and the source of suction 42, and the brakes may be held applied at a constant pressure as long as desired.

It will now be clear that I have provided means whereby a power cylinder may be conveniently placed in communication with the atmosphere or with a source of suction. With the present system the brakes of a vehicle may be applied by closing an electric circuit and this may be accomplished either by depression of the brake pedal or by a push button or other type of hand switch as shown. The hand switch may have any convenient location and is particularly useful when it becomes necessary to stop and then start up a grade since its use leaves the right foot of an operator free to manipulate the accelerator of the automobile. While the vacuum tank 42 is not necessary it is desirable since the required vacuum for operation of the vehicle brakes will be available on failure of the automobile engine. However, should the vacuum tank 42 be omitted the vacuum may be applied to the power cylinder 17 directly from the suction side of the automobile engine.

Having thus set forth the nature of my said invention, what I claim is:

1. In an electrically controlled power system including a suction operated power device, a control valve including a body having an air inlet port, a power port connected with the power device, and a suction port connected with a source of suction, a movable valve, an armature on said valve, means normally holding said valve in position placing the power port in communication with the air inlet port, an electro magnet adapted when energized to attract said armature and move said valve to a position closing the power port, a second electro magnet operable to attract said armature and shift the valve from a position closing the power port to a position placing the power and suction ports in communication, a normally open circuit to each of said magnets, switch means including a contact for each of said magnets, a movable part mounting said contacts, a second part movable relative to said first part and operable on movement in one direction to successively engage said contacts to close the circuits to the first and second magnets successively, and said first part thereafter movable relative to said second part to open the switch in the circuit to the second magnet and again close the switch in the circuit to the first magnet.

2. In an electrically controlled power system including a suction operated power device, a control valve including a body having an air inlet port, a power port connected with the power device, and a suction port connected with a source of suction, a movable valve, an armature on said valve, means normally holding said valve in position placing the power port in communication with the air inlet port, an electro magnet adapted when energized to attract said armature and move said valve to a position closing the power port, a second electro magnet operable to attract said armature and shift the valve from a position closing the power port to a position placing the power and suction ports in communication, a normally open circuit to each of said magnets, switch means including a contact for each of said magnets, a movable part mounting said contacts, a second part movable relative to said first part and operable on movement in one direction to successively engage said contacts to close the circuits to the first and second magnets successively, said first part thereafter movable relative to said second part to open the switch in the circuit to the second magnet and again close the switch in the circuit to the first magnet, and a shunt circuit connecting said normally open circuits.

3. In an electrically controlled power system including a suction operated power device, a control valve including a body having an air inlet port, a power port connected with the power device, and a suction port connected with a source of suction, a movable valve, an armature on said valve, means normally holding said valve in position placing the power port in communication with the air inlet port, an electro-magnet adapted when energized to attract said armature and move said valve to a position closing the power port, a second electro magnet operable to attract said armature and shift the valve from a position closing the power port to a position placing the power and suction ports in communication, a normally open circuit to each of said magnets, switch means including a contact for each of said magnets, and means operable in one direction to successively and in order close and open the switch in the circuit to the first magnet and then close the switch in the circuit to the second magnet.

4. In an electrically controlled power system including a suction operated power device, a control valve including a body having an air inlet port, a power port connected with the power device, and a suction port connected with a source of suction, a movable valve, an armature on said valve, means normally holding said valve in position placing the power port in communication with the air inlet port, an electro magnet adapted when energized to attract said armature and move said valve to a position closing the power port, a second electro magnet operable to attract said armature and shift the valve from a position closing the power port to a position placing the power and suction ports in communication, a normally open circuit to each of said magnets, switch means including a contact for each of said magnets, and reciprocatory means operable in one direction to successively and in order close and open the switch in the circuit to the first magnet and then close the switch in the circuit to the second magnet.

5. In an electrically controlled power system including a suction operated power device, a control valve including a body having an air inlet port, a power port connected with the power device, and a suction port connected with a source of suction, a rotary valve having a recess therein, an armature on said valve, means normally holding said valve in position with its recess placing the power port in communication with the atmospheric inlet port, a normally open circuit, an electro magnet in said circuit and adapted when energized to attract said armature and rotate said valve to a position closing the power port, a second normally open circuit, an electro magnet in said second circuit and adapted when energized to attract the armature and rotate the valve to have the recess of the latter place the power and suction ports in communication, a control switch for each circuit, controlling means for opening and closing the switches of said circuits in succession, and a resistance shunted across said normally open circuits.

6. In an electrically controlled power system including a suction operated power device, a control valve including a body having an air inlet port, a power port connected with the power device, and a suction port connected with a source of suction, a rotary valve having a recess therein, an armature on said valve, means normally holding said valve in position with its recess placing the power port in communication with the atmospheric inlet port, a normally open circuit, an electro magnet in said circuit and adapted when energized to attract said armature and rotate said valve to a position closing the power port, a second normally open circuit, an electro magnet in said second circuit and adapted when energized to attract the armature and rotate the valve to have the recess of the latter place the power and suction ports in communication, switch means for closing said circuits comprising a contact in each of said circuits, means manually operable in one direction to engage and release one contact to control the first circuit and thereafter engage the second contact for the second circuit, and spring means to return said manually operable means to normal position.

7. In an electrically controlled power system including a suction operated power device, a control valve including a body having an air inlet port, a power port connected with the power device, and a suction port connected with a source of suction, a rotary valve having a recess therein, an armature on said valve, means normally holding said valve in position with its recess placing the power port in communication with the atmospheric inlet port, a normally open circuit, an electro magnet in said circuit and adapted when energized to attract said armature and rotate said valve to a position closing the power port, a second normally open circuit, an electro magnet in said second circuit and adapted when energized to attract the armature and rotate the valve to have the recess of the latter place the power and suction ports in communication, switch means for closing said circuits comprising a contact in each of said circuits, means manually operable in one direction to engage and release one contact to close and open the switch in the first circuit and thereafter engage the second contact and close the switch in the second circuit, spring means to return said manually operable means to normal position, and a resistance shunted across said normally open circuits.

8. In an electrically controlled power system including a suction operated power device, a control valve including a body having an air inlet port, a power port connected with the power device, and a suction port connected with a source of suction, a movable valve, an armature on said valve, means normally holding said valve in position placing the power port in communication with the air inlet port, an electromagnet adapted when energized to attract said armature and move said valve to a position closing the power port, a second electromagnet operable to attract said armature and shift the valve from a position closing the power port to a position placing the power and suction ports in communication, a normally open circuit to each of said magnets, switch means including a contact for each of said magnets, a movable part mounting said contacts, means connecting said part with the power device to move therewith, a second part movable relative to the first part, an operating pedal connected to the second part, said second part operable on movement in one direction by said pedal to successively engage said contacts to close the circuits to the first and second magnets successively, and said first part thereafter movable with the power device relative to said second part to open the switch in the circuit to the second magnet and again close the switch in the circuit to the first maget.

9. In an electrically controlled power system including a suction operated power device, a control valve including a body having an air inlet port, a power port connected with the power device, and a suction port connected with a source of suction, a movable valve, an armature on said valve, means normally holding said valve in position placing the power port in communication with the air inlet port, an electromagnet adapted when energized to attract said armature and move said valve to a position closing the power port, a second electromagnet operable to attract said armature and shift the valve from a position closing the power port to a position placing the power and suction ports in communication, a normally open circuit to each of said magnets, switch means including a contact for each of said magnets, a movable part mounting said contacts, a second part movable relative to said first part and having means to engage the contacts to close the circuits, an operating pedal connected to one of said parts to shift it, a connection from the other part to the power device to move therewith, said parts operable on relative movement in one direction by the pedal to successively engage said contacts to close the circuits to the first and second magnets successively, and said parts thereafter relatively movable with the power device in the opposite direction to open the switch in the circuit to the second magnet and close the switch in the circuit to the first magnet.

10. In an electrically controlled power system including a suction operated power device, a control valve including a body having an air inlet port, a power port connected with the power device, and a suction port connected with a source of suction, said valve normally in a position placing the power port in communication with the air inlet port, electrical means for shifting the valve to close the power port, a second electrical means to shift the valve to a position to place the power port in communication with the suction port, a normally open circuit to each of said electrical means, a normally open switch in each circuit and a switch means comprising a movable member operable to close said switches successively and open the first switch by movement in one direction only.

11. In an electrically controlled power system including a suction operated power device, a control valve including a body having an air inlet port, a power port connected with the power device, and a suction port connected with a source of suction, said valve normally in a position placing the power port in communication with the air inlet port, electrical means for shifting the valve to close the power port, a second electrical means to shift the valve to a position to place the power port in communication with the suction port, a normally open circuit to each of said electrical means, a switch means comprising a pair of relatively movable parts, a normally open switch for each circuit carried by one of the parts, means carried by the other part for closing said switches in succession and then opening the first closed switch while the second remains closed on relative movement of said parts in one direction, a connection from the first part to the power device to move therewith, an operating pedal connected to the second part to shift it to operate the switches in succession, and said first part thereafter movable with the power device relative to the second part to open the second switch and close the first.

12. In an electrically controlled power system including a suction operated power device, a control valve including a body having an air inlet port, a power port connected with the power device, and a suction port connected with a source of suction, said valve normally in a position placing the power port in communication with the air inlet port, electrical means for shifting the valve to close the power port, a second electrical means to shift the valve to a position to place the power port in communication with the suction port, a normally open circuit to each of said electrical means, a pair of relatively movable parts, a normally open switch for each circuit carried by one of the parts, means carried by the other part for closing said switches in succession and opening the first switch on relative movement of the parts in one direction, an operative pedal connected with one of the parts to cause said relative movement, and an operative connection from the other part to the power device to cause relative movement of the parts in the opposite direction to open the second switch and close the first.

13. In an electrically controlled power system including a fluid pressure operated power device, a control valve including a body having a port communicating with the atmosphere, a power port connected with the power device, and a port connected with a source of differential pressure, a movable valve, an armature on said valve, means normally holding said valve in position placing the power port in communication with the atmospheric port, an electromagnet adapted when energized to attract said armature and move said valve to a position closing the power port, a second electromagnet operable to attract said armature and shift the valve from the position closing the power port to a position placing the power port and the differential pressure port in communication, a normally open circuit for each of said magnets, switch means including a contact for each of said magnets, a movable part mounting said contacts, a second part movable relative to said first part and operable on movement in one direction to successively engage said contacts to close the circuits to the first and second magnets successively and open the first circuit while the second remains closed, and said first part thereafter movable relative to said second part to open the switch in the circuit for the second magnet and again close the switch in the circuit for the first magnet by movement in one direction.

14. In an electrically controlled power system including a fluid pressure operated power device, a control valve including a body having a port communicating with the atmosphere, a power port connected with the power device, and a port connected with a source of differential pressure, a movable valve, an armature on said valve, means normally holding said valve in position placing the power port in communication with the atmospheric port, an electromagnet adapted when energized to attract said armature and move said valve to a position closing the power port, a second electromagnet operable to attract said armature and shift the valve from the position closing the power port to a position placing the power port and the differential pressure port in communication, a normally open circuit for each of said magnets, switch means including a contact for each of said magnets, and means operable in one direction to successively and in order close and open the switch in the circuit to the first magnet and then close the switch in the circuit to the second magnet.

15. In an electrically controlled power system including a fluid pressure operated power device, a control valve including a body having a port communicating with the atmosphere, a power port connected with the power device, and a port connected with a source of differential pressure, a movable valve, an armature on said valve, means normally holding said valve in position placing the power port in communication with the atmospheric port, an electromagnet adapted when energized to attract said armature and move said valve to a position closing the power port, a second electromagnet operable to attract said armature and shift the valve from the position closing the power port to a position placing the power port and the differential pressure port in communication, a normally open circuit for each of said magnets, switch means including a contact for each of said magnets, a movable part mounting said contacts, a second part movable relative to said first part and operable on movement in one direction to successively engage said contacts to close the circuits to the first and second magnets successively and open the first circuit while the second remains closed, and said first part thereafter movable relative to said second part to open the switch in the circuit for the second magnet and again close the switch in the circuit for the first magnet by movement in one direction and a resistance shunted across said normally open circuits.

16. In an electrically controlled power system including a fluid pressure operated power device; a control valve capable of three positions comprising a normal position rendering the power device ineffective, a second position maintaining the power device in a state of equilibrium with pressure applied to the system, and a third position rendering the power device effective to apply pressure to the system; an electrical means for shifting the valve from the first to second position, a second electrical means for shifting the valve from the second to the third position, a normally open circuit to each of said electrical means, a pair of relatively movable parts, a normally open switch for each circuit carried by one of the parts, means carried by the other part for closing said switches in succession and opening the first switch on relative movement of the parts in one direction, an operative lever connected with one of the parts to cause said relative movement, and an operative connection from the other part to the power device to cause relative movement of the parts in the opposite direction upon retarded movement of the lever to open the second switch and close the first switch to maintain the valve in the second position.

17. In an electrically controlled power system including a fluid pressure operated power device; a control valve capable of three positions comprising a normal position rendering the power device ineffective, a second position maintaining the power device in a state of equilibrium with pressure applied to the system, and a third position rendering the power device effective to apply pressure to the system; an electrical means for shifting the valve from the first to second position, a second electrical means for shifting the valve from the second to the third position, a normally open circuit to each of said electrical means, a pair of relatively movable parts, a normally open switch for each circuit carried by one of the parts, means carried by the other part for closing said switches in succession and opening the first switch on relative movement of the parts in one direction, an operative lever connected with one of the parts to cause said relative movement, and an operative connection from the other part to the power device to cause relative movement of the parts in the opposite direction upon retarded movement of the lever to open the second switch and close the first switch to maintain the valve in the second position, said switches and closing means constructed and arranged so that the first switch is not opened until the second switch is closed.

JOSEPH F. HEALY, Jr.